United States Patent
Feng et al.

(10) Patent No.: US 7,234,097 B1
(45) Date of Patent: Jun. 19, 2007

(54) METHODS OF SUPPORTING HOST CRC IN DATA STORAGE SYSTEMS WITHOUT RLL CODING

(75) Inventors: Weishi Feng, San Jose, CA (US); Zhan Yu, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 639 days.

(21) Appl. No.: 10/701,271

(22) Filed: Nov. 4, 2003

Related U.S. Application Data

(60) Provisional application No. 60/442,956, filed on Jan. 27, 2003.

(51) Int. Cl.
*H03M 13/00* (2006.01)
(52) U.S. Cl. .................... 714/758; 714/781
(58) Field of Classification Search ........... 714/758, 714/752, 781
See application file for complete search history.

(56) References Cited

U.S. PATENT DOCUMENTS

| | | | |
|---|---|---|---|
| 6,460,145 B1 | 10/2002 | Sassa et al. | |
| 6,473,876 B1 | 10/2002 | Kondo et al. | |
| 6,618,395 B1 * | 9/2003 | Kimmitt | 370/473 |
| 6,671,832 B1 * | 12/2003 | Apisdorf | 714/52 |
| 6,738,953 B1 * | 5/2004 | Sabharwal et al. | 716/1 |
| 6,850,499 B2 * | 2/2005 | Wheatley et al. | 370/328 |
| 7,082,258 B2 * | 7/2006 | Kwak | 386/114 |
| 2003/0135798 A1 * | 7/2003 | Katayama et al. | 714/710 |

OTHER PUBLICATIONS

U.S. Appl. No. 10/423,552, filed Apr. 25, 2003, Weishi Feng.
U.S. Appl. No. 10/693,796, filed Aug. 12, 2003, Weishi Feng.

* cited by examiner

*Primary Examiner*—Albert Decady
*Assistant Examiner*—Esaw Abraham

(57) ABSTRACT

A communications channel that receives a user data sequence including N symbols and that supports host CRC includes a host bus interface (HBI) that generates cyclic redundancy check ($CRC_U$) bits based on the user data sequence. A data dependent scrambler (DDS) receives the user data sequence and the $CRC_U$ bits and generates a scrambling seed. The DDS generates a scrambled user data sequence that is based on the user data sequence and the scrambling seed and generates a difference sequence.

26 Claims, 6 Drawing Sheets

METHODS OF SUPPORTING HOST CRC IN DATA STORAGE SYSTEMS WITHOUT RLL CODING

CROSS-REFERENCE TO RELATED APPLICATIONS

This application claims the benefit of U.S. Provisional Application No. 60/442,956, filed on Jan. 27, 2003, which is hereby incorporated by reference in its entirety.

FIELD OF THE INVENTION

The present invention relates to data coding in a communications channel, and more particularly to data coding that reduces unwanted bit patterns in a communications channel.

BACKGROUND OF THE INVENTION

Magnetic storage systems such as disk drives include a magnetic medium or platter with a magnetic coating that is divided into data tracks. The data tracks are divided into data sectors that store fixed-sized data blocks. A read/write head typically includes a write circuit and write element such as an inductor that selectively generates positive and negative magnetic fields that are stored by the magnetic medium. The stored positive and negative fields represent binary ones and zeros. The read/write head includes an element such as a magneto-resistive element that senses the stored magnetic field to read data from the magnetic medium. A spindle motor rotates the platter and an actuator arm positions the read/write head relative to the magnetic medium.

Magnetic storage systems typically code the user data sequence or user data using Run Length Limited (RLL) code. RLL coding eliminates sequences in the user data that may cause problems with timing circuits of the magnetic storage system. For example, a RLL code enforces constraints on the number of consecutive ones and/or zeros that are allowed to occur in the data. The efficiency of the RLL code is typically measured in terms of a code rate. For every m-bits or m-bytes of user data, an n-bit or n-byte encoded word is written to the storage media. RLL codes are used to eliminate unwanted bit patterns in the data and typically do not have error correction capability. RLL coding, however, reduces data storage capacity by increasing channel bit density (CBD), which reduces a signal to noise ratio (SNR) and may lead to lower reliability.

Referring now to FIG. 1, a write-path of a data storage system with RLL coding is shown. A host bus interface (HBI) 14 receives user data from a host computer 16. A buffer manager (BM) 18 initially stores the user data in a buffer 20 and then sends the user data from the buffer 20 to a disk formatter (DF) 22 with proper timing. An ECC/CRC encoder 24 appends CRC bits to the user data. The CRC bits are calculated based on the user data.

ECC bits are computed based on the user data and the CRC bits and appended thereto. A scrambler 26 generates a pseudo-random scrambling sequence that is based on a polynomial and seed. The user data and the scrambling sequence are input to an XOR gate 27, which outputs scrambled user data. A RLL encoder 28 is used to constrain the unwanted bit patterns in the scrambled user data sequence.

To increase SNR and data storage capacity, data storage systems were developed without RLL coding using data-dependent scramblers (DDS). Data is processed by the DDS to eliminate unwanted bit patterns. The DDS is disclosed in "Improved Data Coding For Enforcing Constraints On Ones and Zeros In a Communications Channel", U.S. patent application Ser. No. 10/423,552, filed Apr. 25, 2003, which is commonly assigned and is hereby incorporated by reference in its entirety. The scrambled user data from the DDS is forwarded to an ECC/CRC encoder, which generates and appends CRC and ECC bits to the user data.

Because the CRC and ECC bits may also contain unwanted bit patterns, traditional RLL coding may be used to encode the ECC/CRC portion. The data storage system is still referred to as being without RLL coding because the CRC and/or ECC bits are relatively small in number as compared to the number of bits in the user data. In data storage systems without RLL coding, the CRC bits are generated and appended by the ECC/CRC encoder. Because the ECC/CRC encoder is located downstream from other devices, such as the disk formatter (DF), the buffer manager (BM), the buffer, etc., the CRC bits that are generated do not detect errors that are generated in these devices.

Referring now to FIG. 2, a write-path of a data storage system that includes the DDS is shown. The host computer 16 generates user data that is transferred to the host bus interface (HBI) 14. The buffer manager (BM) 18 receives the user data from the HBI 14 and controls the data flow through the write path. The user data is periodically stored in the buffer 20. The BM 18 passes the user data on based on sequence timing of data flow through the write path. The disk formatter (DF) 22 receives the user data from the BM 18 and formats the user data.

A data dependent scrambler (DDS) 40 receives the user data from the DF 22 and scrambles the user data to eliminate the unwanted bit patterns. An ECC/CRC encoder 42 appends CRC bits that are calculated based on the scrambled user data. ECC bits are also computed based on the scrambled user data and the CRC bits and appended to the scrambled user data.

A host CRC feature is sometimes used to maximize the error detection capability of the data storage system without adding more error detecting code, such as another layer of CRC. In traditional host CRC systems, the CRC is generated in the host bus interface (HBI), which initially receives the user data from the host computer. The CRC is generated on the write path using the same polynomial and seed as those used in the ECC/CRC encoder. Therefore, the ECC/CRC encoder can use the same CRC bits to detect ECC miscorrections without losing format efficiency. Additionally, on the read path, while the user data is transferred from the HBI to the host computer, a CRC check detects any errors that occur.

Although the host CRC feature is supported by a traditional data storage system with RLL coding, it is more difficult to implement the host CRC feature in a data storage system having a DDS. This is due to the fact that the user data at the HBI and the data at the ECC/CRC encoder 42 are different. Therefore, the CRC generated at the HBI cannot be used by the ECC/CRC encoder to detect miscorrection even if the same CRC generator polynomials are used.

SUMMARY OF THE INVENTION

Accordingly, the present invention provides a communications channel that receives a user data sequence including N symbols and that supports host CRC. The communications channel includes a host bus interface (HBI) that generates cyclic redundancy check ($CRC_U$) bits based on the user data sequence. A data dependent scrambler (DDS) receives the user data sequence and the $CRC_U$ bits and generates a scrambling seed. The DDS generates a scrambled user data sequence that is based on the user data sequence and the scrambling seed and generates a difference sequence.

In one feature, the DDS includes a CRC encoder that generates $CRC_D$ bits that are based on the difference sequence. An error correction coding (ECC)/CRC device generates ECC and $CRC_W$ bits that are based on the scrambled user data sequence, the $CRC_U$ bits and the $CRC_D$ bits from the DDS. The $CRC_W$ bits are equal to $CRC_U$ XOR $CRC_D$. A run length limited (RLL) coding device generates an RLL sequence based on the $CRC_W$ bits and the ECC bits.

In another feature, the DDS includes a data buffer that receives the user data sequence and a seed finder that generates the scrambling seed, which is dependent upon the symbols in the user data sequence. A scrambler receives the user data sequence from the data buffer and the scrambling seed from the seed finder and generates the scrambled user data sequence.

In another feature, the DDS further includes an H-code finder that generates an H-code, which is dependent upon the symbols in the user data sequence. An H-code encoder receives the scrambled user data sequence and increases a Hamming weight of the scrambled user data sequence based on the H-code. An interleave encoder receives the scrambled user data sequence from the H-code encoder and reduces the number of consecutive zeros in interleaved subsequences of the scrambled user data.

In another feature, the communications channel is implemented in a write path of a data storage system.

In still another feature, the DDS generates the difference sequence by performing a bitwise exclusive (XOR) operation on the user data sequence and the scrambled user data sequence.

In yet another feature, the communications channel further includes at least one of a buffer manager, a buffer and a disk formatter that is located between the HBI and the DDS.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
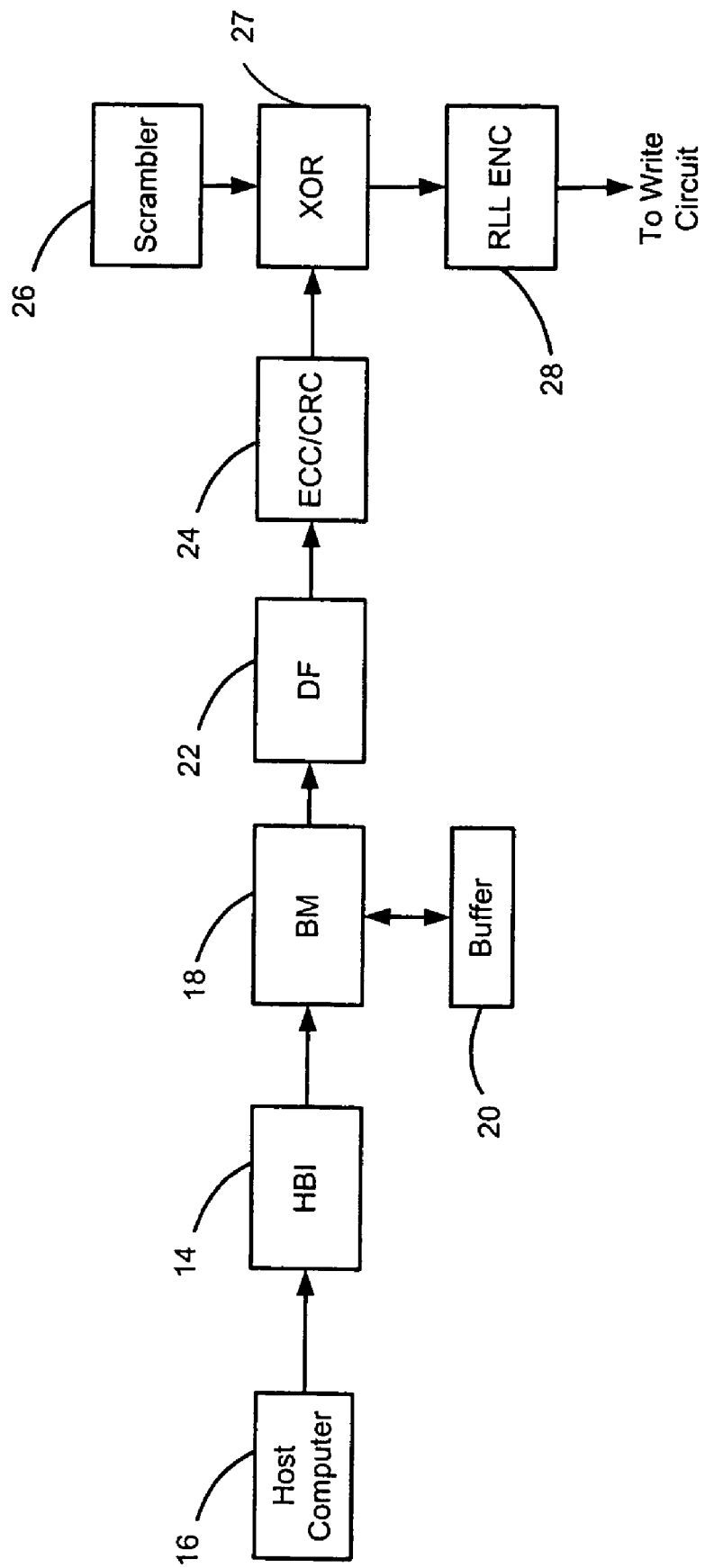
FIG. 1 is a functional block diagram of a data storage system with RLL coding according to the prior art.

The following description of the preferred embodiments is merely exemplary in nature and is in no way intended to limit the invention, its application, or uses. For purposes of clarity, the same reference numbers will be used in the drawings to identify similar elements.

While the present invention will be described in the context of a data storage system, skilled artisans will appreciate that the present invention can be applied to any binary communications channel with constraints on the number of consecutive ones or zeros. As will be described further below, the data storage system according to the present invention does not employ RLL coding on a user data portion. The present invention discloses a coding technique that eliminates unwanted bit patterns with a smaller reduction in data storage capacity as compared to RLL coding. In other words, the coding technique according to the present invention reduces the channel bit density (CBD) less than data storage systems using RLL coding on the user data. As used herein, the term data dependent scrambler (DDS) is defined as a scrambler that alters at least one of a selected scrambler, a generating polynomial, a seed, and a scrambling sequence based upon current user data that is to be scrambled.

Figure 2:
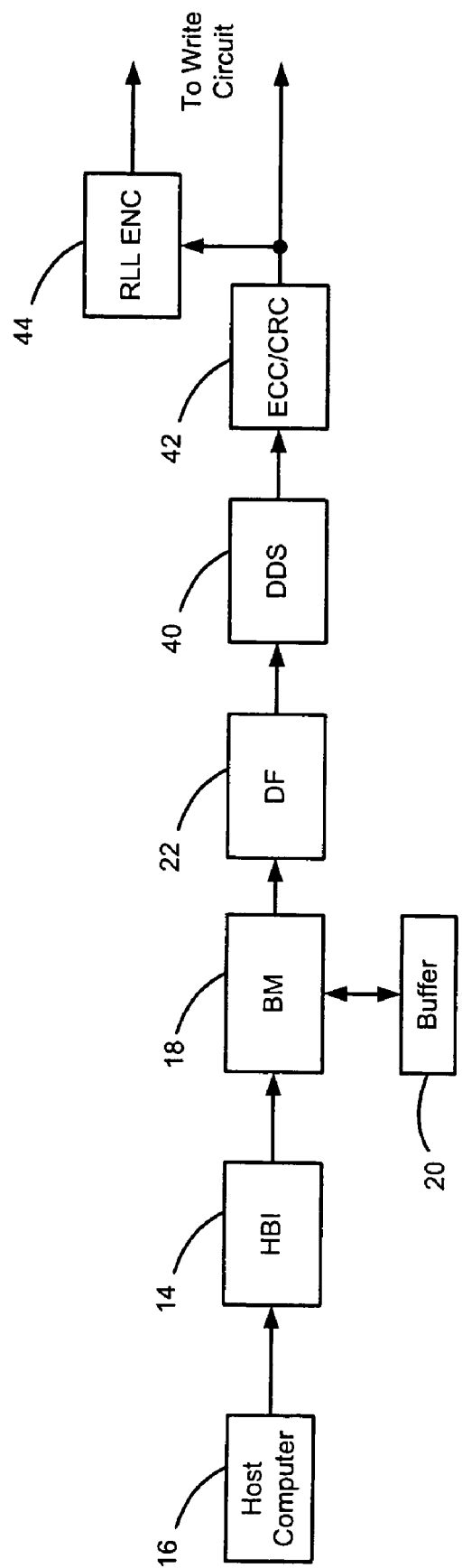
FIG. 2 is a functional block diagram of a data storage system with a data dependent scrabler (DDS) coding according to the prior art.
Figure 3:
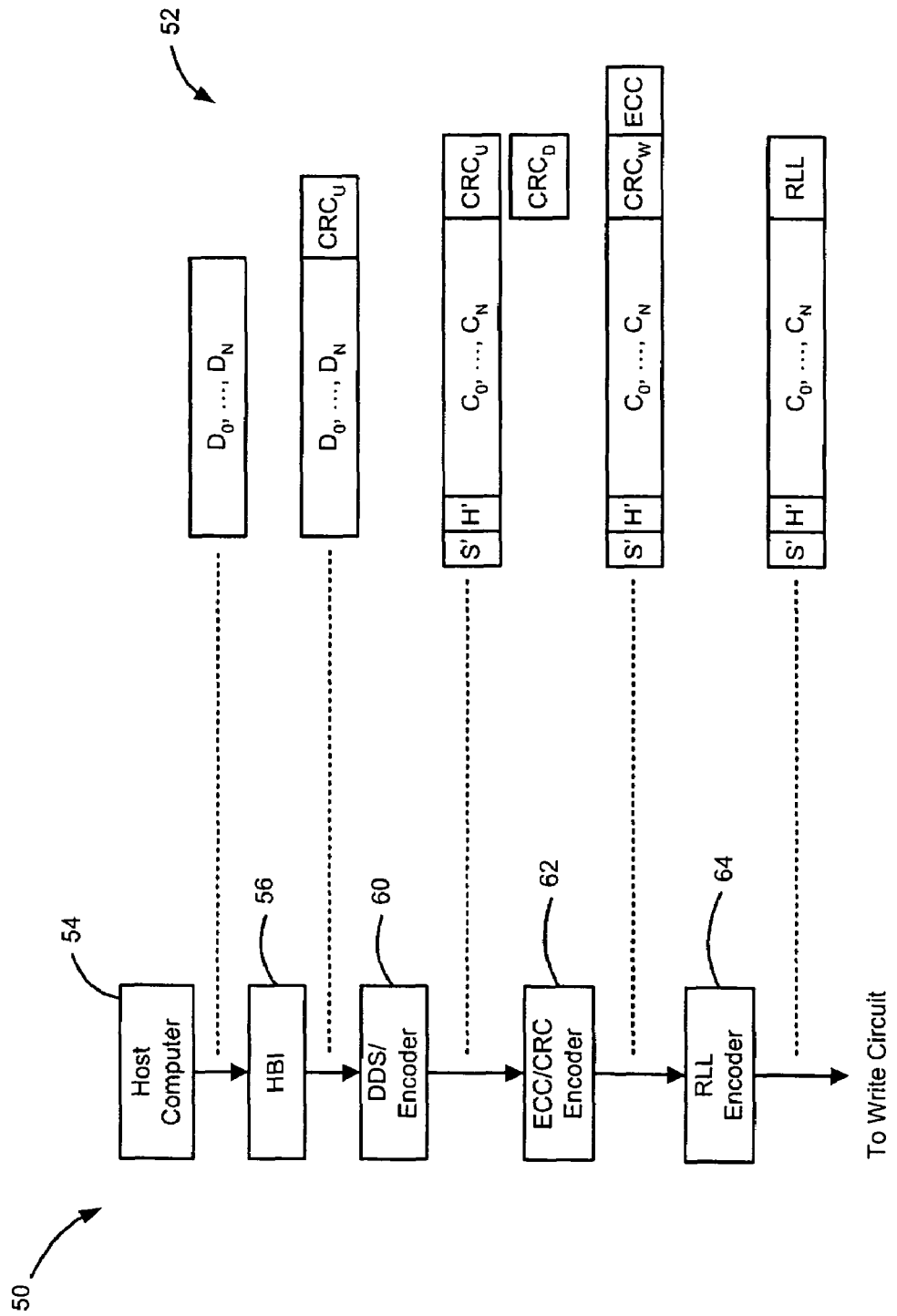
FIG. 3 is a functional block diagram of a write path of a data communication channel according to the present invention and corresponding user data.

Referring now to FIG. 3, a write path 50 of a communications channel is illustrated with a corresponding user data description that is generally identified at 52. A host computer 54 outputs user data to a host bus interface (HBI) 56. Although not illustrated, other elements of the write path 50 may also include the buffer manager 18, the buffer 20, and the disk formatter 22 as shown in FIGS. 1 and 2. A data dependent scrambler (DDS)/encoder 60 receives the user data from the HBI 56 and processes the user data to remove unwanted bit patterns. The scrambled user data from the DDS/encoder 60 is processed by an ECC/CRC encoder 62, which appends CRC bits that are calculated based on the scrambled user data and ECC bits that are calculated based on the scrambled user data and the CRC bits. A RLL encoder 64 encodes the ECC and CRC bits of the scrambled user data to remove any undesired bit patterns in these portions.

The HBI 56 in the write path 50 generates and appends CRC bits to the user data. The CRC bits are generated using the same polynomial and seed as those used in the ECC/CRC encoder 62. The ECC/CRC encoder 62 uses the same CRC bits to detect ECC miscorrections without losing format efficiency.

Figure 4:
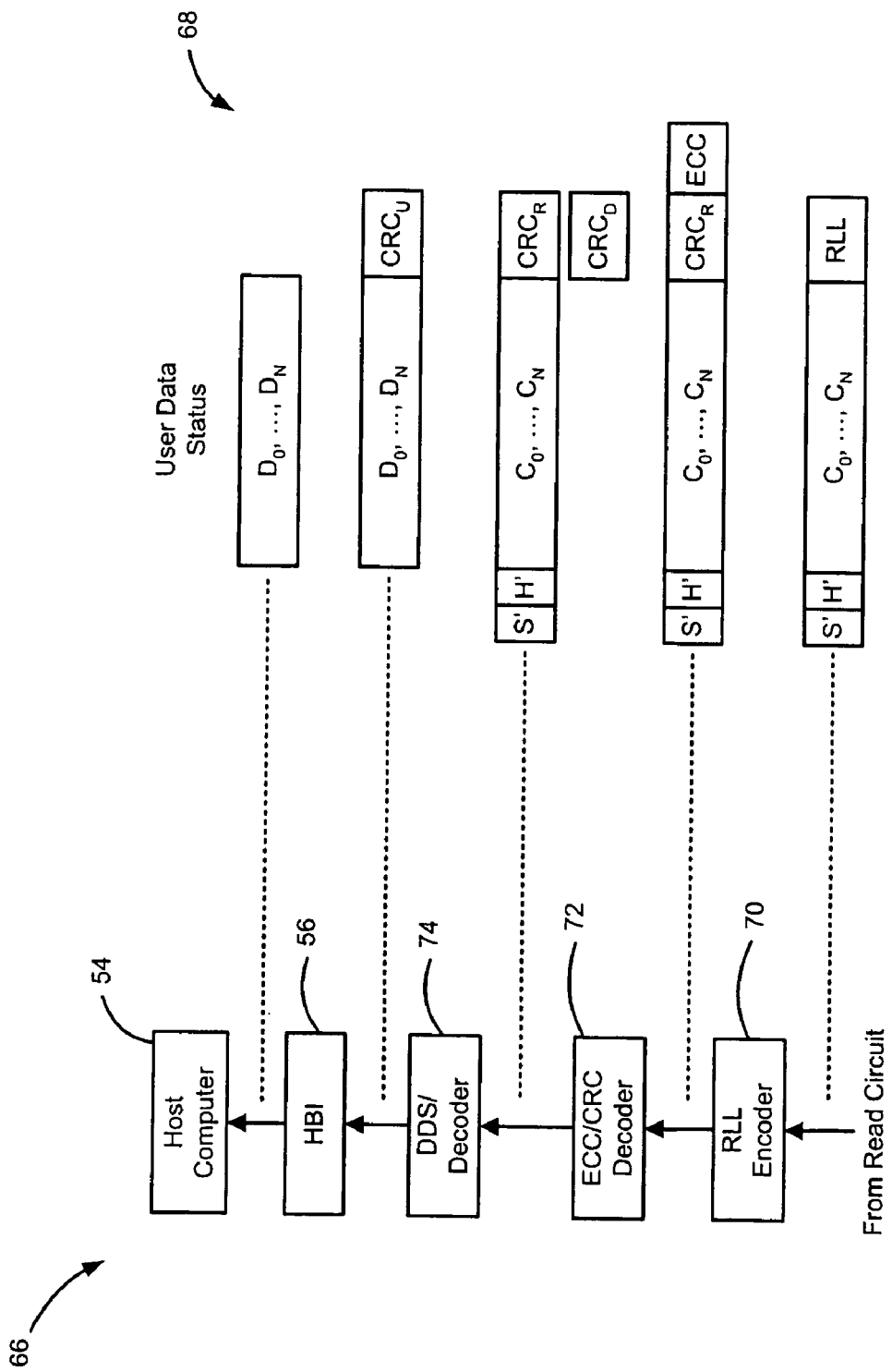
FIG. 4 is a functional block diagram of a read path of the data communication channel according to the present invention and corresponding user data.

Referring now to FIG. 4, components of a read path 66 of the communications channel are illustrated with a corresponding user data description that is generally identified at 68. The read path 66 transfers data from the data storage system to the host computer 54. Although not illustrated, other elements of the read path 66 can include the buffer manager 18, the buffer 20, and the disk formatter 22 shown in FIGS. 1 and 2. A RLL decoder 70 decodes the RLL code that was generated based on the ECC and CRC bits. An ECC/CRC decoder 72 receives the output of the RLL decoder 70, decodes the ECC/CRC bits and attempts to correct errors. A DDS/decoder 74 reverses the scrambling and encoding that was performed by the DDS/encoder 60.

Figure 5:
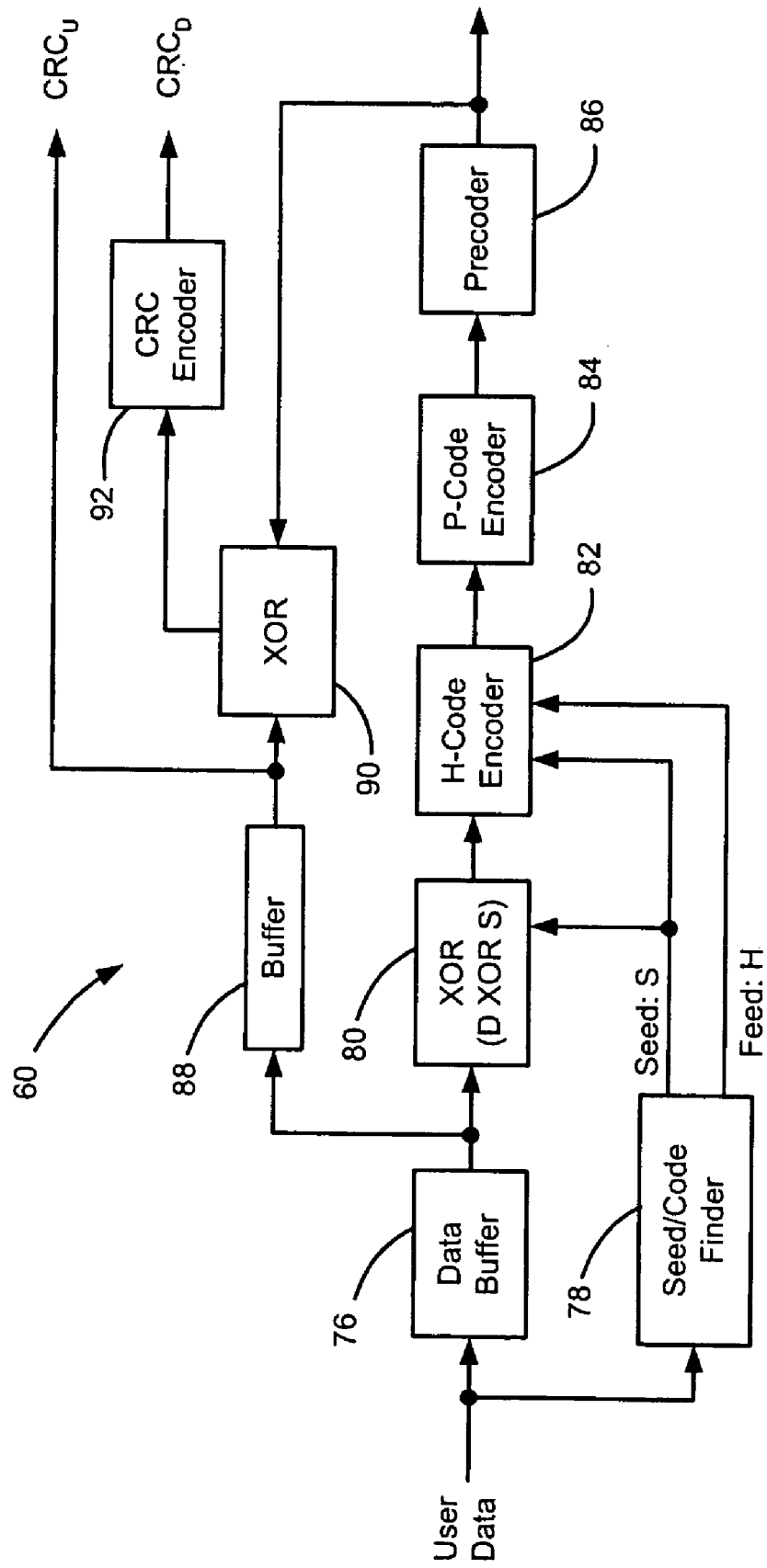
FIG. 5 is a functional block diagram of a data dependent scrambler (DDS) of the data communication channel, which supports host cyclic redundancy check (CRC), according to the present invention.

Referring now to FIG. 5, the DDS/encoder 60 is shown in further detail and includes a data buffer 76 that receives the user data and coordinates data transfer timing through the DDS/encoder 60. A seed/code finder 78 generates a scrambling seed (S) and a Hamming weight code or H-code (H) as described in further detail below. A first exclusive OR (XOR) gate 80 performs bit-wise XOR on the user data and the scrambling seed (S) from the seed/code finder 78 to generate a scrambled user data sequence.

An H-code encoder 82 receives the scrambled user data sequence from the XOR gate 80 and the H-code (H) and encodes the scrambled user data sequence to improve the worst-case Hamming weight thereof, as will be described further below. A P-code encoder 84 receives the encoded and scrambled data sequence and encodes the data sequence to limit the maximum length of a run of zeros in the sub-sequences, as will be described further below. A precoder 86 optionally transfers all data in the interleaved nonreturn-to-zero-inverse (INRZI) or nonreturn-to-zero-inverse (NRZI) domain into the nonreturn-to-zero (NRZ) domain.

The DDS/encoder 60 further includes a buffer 88 that transfers the user data to a second XOR gate 90 and to the ECC/CRC encoder 62. The second XOR gate 90 performs bit-wise XOR on the user data and the output of the precoder 86 to generate a difference sequence. A CRC encoder 92 outputs $CRC_D$ bits that are generated based on the difference sequence to the ECC/CRC encoder 62 based on the output of the second XOR gate 90.

The operation of the DDS/encoder 60 will be described with reference to FIG. 3. In this description, an exemplary M-bit symbol data sequence (D={$D_{N-1}$, $D_{N-2}$, ..., $D_0$}) of size N is used, where M=10 (i.e., 10-bit symbol data sequence). As can be appreciated, any sequence or symbol size can be used. The user data (D) is initially sent to the data buffer 76 and the seed/code finder 78. The user data is output to the first XOR 80. The delay of the data buffer 76 is sufficient to allow the scrambling seed S and H-code H to be generated by the seed/code finder 78.

Given the exemplary data sequence D, there are 1023 non-zero 10-bit symbols. More specifically, if the number of bits in the symbol is M, it is always possible to find a seed S if $N<2^M$. This is because not all of the $2^M$ different possible symbols can be included in a data sequence of fewer than $2^M$ symbols. Assuming that the user data includes 4096 bits that are organized into 10-bit symbols, there are at least 203 (1023−2*410) non-zero symbols that are different from any of the data symbols and their complements (i.e., bit-wise inversion). More particularly, the seed/code finder 78 preferably excludes symbols with a Hamming weight of one. S and H are selected such that they are different from any of the user data symbols and their complements. H is also not the complement of S. S is transmitted to the first XOR gate 80 and S and H are transmitted to the H-code encoder 82.

A scrambling sequence {S, S, ..., S} is formed by repeating the scrambling seed S N times. The first XOR gate 80 performs bit-wise XOR of the scrambling sequence {S, S, ..., S} with the data sequence D={$D_{N-1}$, $D_{N-2}$, ..., $D_0$} to obtain a scrambled sequence C={$C_{N-1}$, $C_{N-2}$, ..., $C_0$}. The scrambled data sequence (C={$C_{N-1}$, $C_{N-2}$, ..., $C_0$}) does not contain either an all-zero symbol or an all-one symbol. At a minimum, each symbol includes one "1" and nine "0"'s, which provides a worst-case Hamming weight of one (or 10% for M=10) for the scrambled user data sequence.

To improve the worst-case Hamming weight of the scrambled user data sequence C, the H-code encoder 82 uses a first token ($token_1$) and its complement ($token_2$) to perform additional coding. An H-code decoder that is associated with the DDS/decoder 74 on the read path 66 reverses the H-code encoding. The H-code encoder 82 generates $token_1$ by calculating S XOR H. Since H is different from any of the user data symbols and their complements, it follows that both $token_1$ and $token_2$ are different from any of the scrambled data symbols of the set C. The H-code encoder 82 appends both S and H in the H-coded data sequence. Both S and H are processed by the P-code encoder 84 along with the H-coded scrambled data symbols. S' and H' correspond to the P-coded encoded S and H.

The H-code encoder 82 maps M bit symbols to less than M bit symbols (for example, 10-bits to 6-bits using a look-up table) in certain circumstances described below. The 6-bit patterns have a Hamming weight of at least weight two. The 10-bit to 6-bit look-up table is stored in memory and is static. There are ten symbols with a Hamming weight one and forty-five symbols having a Hamming of weight two. In total, there are fifty-five 10-bit symbols to convert using the table. Further, there are fifteen weight two 6-bit patterns, twenty weight three 6-bit patterns, fifteen weight four 6-bit patterns, six weight five 6-bit patterns and one weight six 6-bit pattern. Therefore, the fifty-five weight one and weight two 10-bit symbols can be converted into fifty-five of the fifty-seven possible 6-bit symbols of weight two or greater. This enables a one-to-one correspondence that is reversible.

The H-code encoder 82 processes the scrambled symbol set C two symbols at a time. If the total Hamming weight of the two symbol group is at least four, the data is passed on without change. If the total Hamming weight of the two symbol group is two or three (i.e., [1,1] or [1,2]), a symbol replacement occurs. The H-code encoder 82 inserts $token_1$ for the symbol on the left (i.e., the first symbol of the two-symbol set). For the symbol on the right (i.e., the second symbol of the two-symbol set), the first four bits of the 10-bit symbol are used to indicate the position of the "1" in the symbol having the Hamming weight of one. The second symbol is converted into a 6-bit symbol using the table described above. If the Hamming weight of the two-symbol group is three with [2,1], the H-code encoder 82 inserts $token_2$ on the left. The H-code encoder 82 uses the first four bits of the 10-bit symbol to indicate the position of the "1" in the Hamming weight one symbol. The second symbol is converted into a 6-bit symbol using the table described above.

The H-coded scrambled data sequence does not contain either the all-zero symbol or the all-one symbol. As a result, there are at most eighteen consecutive zeros in the H-coded data sequence. However, it is still possible to have a long run of zeros in the sub-sequences. The P-code encoder 84 limits the maximum length of a run of zeros in the sub-sequences.

The P-code encoder 84 selects two symbols of the H-code data sequence at a time, for example symbol a ($a_0$, ..., $a_9$) and symbol b ($b_0$, ..., $b_9$). The P-code encoder 84 processes symbols a and b by checking the results after bit-interleaving. The P-code encoder 84 determines whether one of the potentially interleaved symbols is all-zero. If one of the potentially interleaved symbols is all zero, bit interleaving is performed as follows:

($a_0$, $b_0$, $a_2$, $b_2$, $a_4$, $b_4$, $a_6$, $b_6$, $a_8$, $b_8$); and
($a_1$, $b_1$, $a_3$, $b_3$, $a_5$, $b_5$, $a_7$, $b_7$, $a_9$, $b_9$)

If the potentially interleaved symbols are not the all-zero symbol, nothing occurs and the P-code encoder 84 processes the next two symbols. If bit-interleaving does occur, an all-zero symbol is generated and the other non-zero symbol has a Hamming weight of at least four. If the non-zero symbol is the all-one symbol, nothing occurs. If the non-zero symbol is not the all-one symbol, the all-zero symbol is replaced by the all-one symbol.

A P-code decoder, which is associated with the DDS/decoder 74 on the read path 66, reverses the P-code encoding process that is described above. If, in a group of two symbols, there is an all-one symbol and an all-zero symbol, bit interleaving occurs as described above. If, in the group, there is an all-one symbol and the other symbol is not the all-zero symbol, the all-one symbol is replaced by the all-zero symbol. Bit interleaving is then performed on the symbol group. Bit interleaving of the two symbols in the group may generate symbols that are the same as either $token_1$ or $token_2$. This, however, does not create any difficulties on the read path 66 because the P-code decoder processes the data before the H-code decoder. Further, the P-code decoded data sequence does not contain any tokens other than those generated by the H-code encoder 82.

As a result of the P-code encoding, the global constraint (G) is increased. The longest length of a run of zeros is 2*M, where M is the symbol size. The interleave constraint (I) is 2*(M−1). The longest length of a run of ones is 4*M−2. In the case of a 10-bit symbol, the DDS achieves a G=20, I=18 and a minimum Hamming weight of 20%.

A more detailed description of the operation and function of the H-code encoder 82 is provided in co-pending U.S. patent application Ser. No. 10/693,796, entitled "Methods and Apparatus for Improving Minimum Hamming Weights of a Sequence", filed on Aug. 12, 2003, which is commonly assigned and which is incorporated herein by reference in its entirety. A more detailed description of the operation and function of the P-code encoder 84 is provided in co-pending U.S. patent application Ser. No. 10/423,552, entitled "Improved Data Coding For Enforcing Constraints On Ones And Zeros In A Communications Channel", filed on Apr. 25, 2003, which is commonly assigned and which incorporated herein by reference in its entirety.

The user data D that is input to the DDS/encoder 60 is transmitted from the buffer 76 to the buffer 88. The buffer 88 aligns the user data with the output of the precoder 86. The second XOR gate 90 performs bit-wise XOR on D and the output of the precoder 86 to provide a difference signal. The difference signal is processed by the CRC encoder 92, which provides a CRC checksum output $CRC_D$. $CRC_D$ is output to the ECC/CRC encoder 62. Because the communications channel includes host CRC, the user data in the data buffer 68 includes appended CRC data that is calculated in the HBI 56 using user data only and is indicated as $CRC_U$. $CRC_U$ is not processed by the DDS/encoder 60 and is passed directly to the ECC/CRC encoder 62 from the buffer 88.

The ECC/CRC encoder 62 replaces $CRC_U$ by $CRC_W$ according to the following relationship:

$$CRC_W = (CRC_U \text{ XOR } CRC_D)$$

As a result, the ECC/CRC decoder 72 can use $CRC_W$ to detect miscorrections on the read path 66 when the user data is read back to the host computer 54. This is because $CRC_W$ is the CRC calculated on the scrambled data sequence C that is processed through the P-code encoder 84.

The CRC field generated after ECC correction is indicated as $CRC_R$. On the read path 66, the DDS/decoder 74 generates a difference sequence and calculates the CRC of the difference sequence, indicated as $CRC_{RD}$. The DDS/decoder 74 also passes the result of $CRC_R$ XOR $CRC_{RD}$ back to the HBI 56 for error detection. If the ECC/CRC decoder 72 corrected all errors, then the following relationships are true:

$$CRC_R = CRC_W = CRC_U \text{ XOR } CRC_D;$$

$$CRC_{RD} = CRC_D; \text{ and therefore,}$$

$$CRC_U = CRC_R \text{ XOR } CRC_{RD}$$

Thus, on the read path 66, the communications channel is able to provide a proper user data sequence D and the corresponding CRC to the HBI 56. Upon successful CRC verification, the HBI 56 delivers user data to the host computer 54 with confidence that there is no error in the data.

Figure 6:
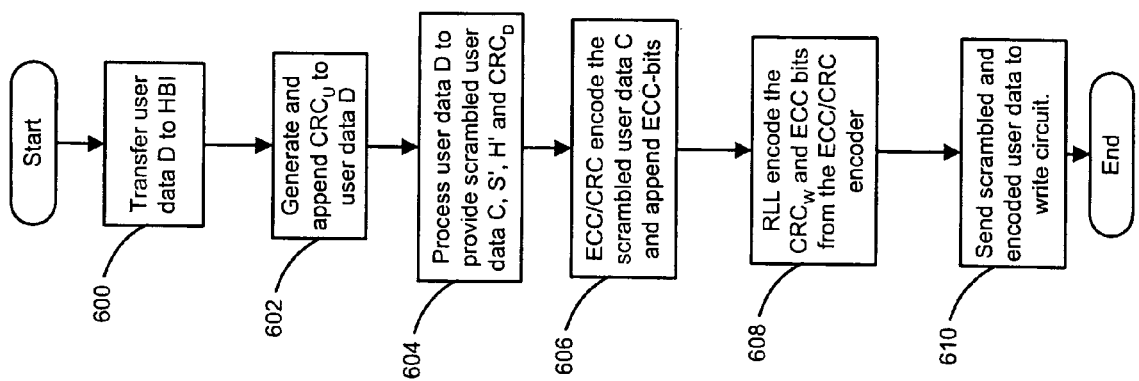
FIG. 6 is a flowchart illustrating user data processing along the write path of the data communication channel.

Referring now to FIGS. 3 and 6, the scrambling and encoding process along the write path 50 is outlined. In step 600, the user data D is transferred to the HBI 56. In step 602, the HBI 56 and/or another device appends CRC-bits that are generated based on the user data D ($CRC_U$) and appends $CRC_U$ to the user data D. The user data D and appended $CRC_U$ are processed through the DDS/encoder 60 in step 604. The output of the DDS/encoder 60 includes the scrambled user data C having S', H' and $CRC_U$ appended thereto and the CRC checksum ($CRC_D$). In step 606, the ECC/CRC encoder 62 processes the output of the DDS/encoder 60 to provided the scrambled user data C having S', H', $CRC_W$ and the ECC-bits appended thereto. The RLL encoder 64 processes the output of the ECC/CRC encoder 62 to encode the $CRC_W$ and ECC portion in step 608. The output of the RLL encoder 64 includes the scrambled user data C having S', H' and the RLL-bits appended thereto. In step 610, the output of the RLL encoder 64 is sent to the write circuit.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A communications channel that receives a user data sequence including N symbols and that supports host CRC, comprising:
   a host bus interface (HBI) that generates cyclic redundancy check ($CRC_U$) bits based on said user data sequence; and
   a data dependent scrambler (DDS) that receives said user data sequence and said $CRC_U$ bits, that selects a scrambling seed based on the N symbols of said user data sequence, that generates a scrambled user data sequence based on said user data sequence and said scrambling seed, and that generates a difference sequence that is based on said user data sequence and said scrambled user data sequence.

2. The communications channel of claim 1 wherein said DDS includes a CRC encoder that generates $CRC_D$ bits that are based on said difference sequence.

3. The communications channel of claim 2 further comprising an error correction coding (ECC)/CRC device that generates ECC and $CRC_W$ bits based on said scrambled user data sequence, said $CRC_U$ bits and said $CRC_D$ bits from said DDS.

4. The communications channel of claim 3 wherein said $CRC_W$ bits are equal to $CRC_U$ XOR $CRC_D$.

5. The communications channel of claim 3 further comprising a run length limited (RLL) coding device that generates an RLL sequence based on said $CRC_W$ bits and said ECC bits.

6. The communications channel of claim 1 wherein said DDS includes:
a data buffer that receives said user data sequence;
a seed finder that generates said scrambling seed, which is dependent upon said symbols in said user data sequence; and
a scrambler that receives said user data sequence from said data buffer and said scrambling seed from said seed finder and that generates said scrambled user data sequence.

7. The communications channel of claim 6 further comprising:
an H-code finder that generates a H-code, which is dependent upon said symbols in said user data sequence; and
an H-code encoder that receives said scrambled user data sequence and that increases a Hamming weight of said scrambled user data sequence using said H-code.

8. The communications channel of claim 7 further comprising an interleave encoder that receives said scrambled user data sequence from said H-code encoder and that reduces the number of consecutive zeros in interleaved subsequences of said scrambled user data.

9. The communications channel of claim 1 wherein said communications channel is implemented in a write path of a data storage system.

10. The communications channel of claim 1 wherein said DDS generates said difference sequence by performing a bitwise exclusive (XOR) operation on said user data sequence and said scrambled user data sequence.

11. The communications channel of claim 1 further comprising at least one of a buffer manager, a buffer and a disk formatter that is located between said HBI and said DDS.

12. The communications channel of claim 1 comprising:
an seed finder that generates said scrambling seed; and
a H-code encoder that generates H-code scrambled data symbols based on said seed.

13. The communications channel of claim 12 further comprising a XOR gate that performs a bit-wise exclusive (XOR) operation on said user data sequence and said scrambling seed, wherein said H-code encoder generates said H-code scrambled data symbols based on output of said XOR gate.

14. The communications channel of claim 12 further comprising a P-code encoder generates P-encoded data symbols based on said H-code scrambled data symbols.

15. The communications channel of claim 14 further comprising a precoder in communication with said P-encoder, wherein said difference sequence is generated based on output of said precoder.

16. A communications channel that receives a user data sequence including N symbols and that supports host CRC, comprising:
interface means for generating cyclic redundancy check ($CRC_U$) bits based on said user data sequence; and
scrambling means for receiving said user data sequence and said $CRC_U$ bits, for selecting a scrambling seed based on the N symbols of said user data sequence, for generating a scrambled user data sequence that is based on said user data sequence and said scrambling seed, and for generating a difference sequence that is based on said user data sequence and said scrambled user data sequence.

17. The communications channel of claim 16 wherein said scrambling means includes encoding means for generating $CRC_D$ bits based on said difference sequence.

18. The communications channel of claim 17 further comprising generating means for generating ECC and $CRC_W$ bits that are based on said scrambled user data sequence, said $CRC_U$ bits, and said $CRC_D$ bits from said scrambling means.

19. The communications channel of claim 18 wherein said $CRC_W$ bits are equal to $CRC_U$ XOR $CRC_D$.

20. The communications channel of claim 18 further comprising coding means for generating an RLL sequence based on said $CRC_W$ bits and said ECC bits.

21. The communications channel of claim 17 wherein said scrambling means includes:
buffer means for storing said user data sequence;
seed finding means for generating said scrambling seed that is dependent upon said symbols in said user data sequence; and
seed scrambling means for receiving said user data sequence from said data buffer and said scrambling seed from said seed finding means and for generating said scrambled user data sequence.

22. The communications channel of claim 21 further comprising:
H-code finding means that generates an H-code, which is dependent upon said symbols in said user data sequence; and
H-code encoding means that receives said scrambled user data sequence for increasing a Hamming weight of said scrambled user data sequence using said H-code.

23. The communications channel of claim 22 further comprising interleave encoding means that receives said scrambled user data sequence from said code encoding means for reducing the number of consecutive zeros in interleaved subsequences of said scrambled user data.

24. The communications channel of claim 17 wherein said communications channel is implemented in a write path of a data storage system.

25. The communications channel of claim 17 wherein said scrambling means generates said difference sequence by performing a bitwise exclusive (XOR) operation on said user data sequence and said scrambled user data sequence.

26. The communications channel of claim 17 further comprising at least one of a buffer manager, a buffer and a disk formatter that is arranged between said interface means and said scrambling means.

* * * * *

UNITED STATES PATENT AND TRADEMARK OFFICE
CERTIFICATE OF CORRECTION

PATENT NO. : 7,234,097 B1  
APPLICATION NO. : 10/701271  
DATED : June 19, 2007  
INVENTOR(S) : Weishi Feng et al.

Page 1 of 1

It is certified that error appears in the above-identified patent and that said Letters Patent is hereby corrected as shown below:

| | |
|---|---|
| Column 3, Line 55 | Delete "scrabler" and insert -- scrambler -- |
| Column 7, Line 32 | Insert -- is -- after "which" |
| Column 8, Line 19 | Delete "provided" and insert -- provide -- |
| Column 9, Line 35 | Delete "an" and insert -- a -- |
| Column 9, Line 45 | Insert -- that -- after "encoder" |

Signed and Sealed this

Sixth Day of May, 2008

JON W. DUDAS  
*Director of the United States Patent and Trademark Office*